(12) United States Patent
Cordes et al.

(10) Patent No.: US 9,426,604 B1
(45) Date of Patent: Aug. 23, 2016

(54) PREVENTION OF INDUCTIVE COUPLING BETWEEN COMPONENTS OF A MOBILE COMMUNICATION DEVICE

(71) Applicant: Sprint Communications Company L.P., Overland Park, KS (US)

(72) Inventors: Kevin R. Cordes, Lee's Summit, MO (US); Clinton H. Loman, Raymore, MO (US); Lyle W. Paczkowski, Mission Hills, KS (US); Kenneth R. Steele, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 444 days.

(21) Appl. No.: 13/873,813

(22) Filed: Apr. 30, 2013

(51) Int. Cl.
*H04B 5/00* (2006.01)
*H04W 4/00* (2009.01)

(52) U.S. Cl.
CPC ..................................... *H04W 4/008* (2013.01)

(58) Field of Classification Search
None
See application file for complete search history.

(56) References Cited

U.S. PATENT DOCUMENTS

| | | | |
|---|---|---|---|
| 6,177,860 B1 | 1/2001 | Cromer et al. | |
| 7,245,213 B1 | 7/2007 | Esterberg et al. | |
| 7,366,806 B2 | 4/2008 | Milenkovic et al. | |
| 7,450,010 B1 | 11/2008 | Gravelle et al. | |
| 7,834,743 B2 | 11/2010 | Nagata et al. | |
| 7,924,156 B2 * | 4/2011 | Colby | G06K 19/0723 235/380 |
| 8,138,922 B2 * | 3/2012 | Lindsay | G06K 19/0716 340/539.26 |
| 8,174,384 B2 * | 5/2012 | Stagg | G06K 7/10217 340/572.1 |
| 8,217,793 B2 | 7/2012 | Broer | |
| 8,311,509 B2 | 11/2012 | Feher | |
| 8,471,708 B1 | 6/2013 | Diorio et al. | |
| 8,487,769 B2 * | 7/2013 | Lindsay | G06K 19/0717 340/539.11 |
| 8,718,554 B2 | 5/2014 | Abel | |
| 8,797,144 B2 | 8/2014 | Hinman et al. | |
| 8,811,971 B2 | 8/2014 | Corda et al. | |
| 8,816,826 B2 * | 8/2014 | Colby | G06K 19/025 340/10.34 |
| 8,866,594 B1 | 10/2014 | Diorio et al. | |
| 9,087,318 B1 | 7/2015 | Cordes et al. | |
| 9,171,243 B1 | 10/2015 | Cordes et al. | |
| 9,286,594 B1 | 3/2016 | Cordes et al. | |
| 9,324,016 B1 | 4/2016 | Cordes et al. | |
| 2005/0045719 A1 | 3/2005 | Yang | |
| 2005/0123596 A1 | 6/2005 | Kohane et al. | |
| 2005/0125396 A1 | 6/2005 | Liu | |
| 2006/0258289 A1 | 11/2006 | Dua | |
| 2007/0035381 A1 | 2/2007 | Davis | |
| 2007/0069852 A1 | 3/2007 | Mo et al. | |
| 2007/0075140 A1 * | 4/2007 | Guez | G06K 19/0707 235/435 |

(Continued)

OTHER PUBLICATIONS

Loman, Clint H., et al., "Radio Frequency Induced Power Reception Management for a Radio Frequency Identity (RFID) Chip Embedded in a Mobile Communication Device," filed Nov. 4, 2014, U.S. Appl. No. 14/532,954.

(Continued)

*Primary Examiner* — Tuan A Tran

(57) ABSTRACT

A method of organizing components of a mobile communication device. The method comprises orienting a radio frequency identity chip of the mobile communication device relative to a general purpose near field communication transceiver of the mobile communication device, locating the radio frequency identity chip in a null region of an electromagnetic field radiated by the general purpose near field communication transceiver, whereby the null region of the electromagnetic field may be below a threshold required to activate the radio frequency identity chip.

18 Claims, 9 Drawing Sheets

(56) References Cited

U.S. PATENT DOCUMENTS

| | | |
|---|---|---|
| 2008/0051142 A1 | 2/2008 | Calvet et al. |
| 2008/0198098 A1 | 8/2008 | Gelbman et al. |
| 2008/0232259 A1 | 9/2008 | Thomson |
| 2008/0303637 A1 | 12/2008 | Gelbman et al. |
| 2009/0164800 A1 | 6/2009 | Johansson et al. |
| 2009/0227290 A1 | 9/2009 | Chien |
| 2010/0075669 A1 | 3/2010 | Sparks et al. |
| 2011/0063093 A1 | 3/2011 | Fung et al. |
| 2011/0254687 A1 | 10/2011 | Arponen et al. |
| 2012/0149338 A1 | 6/2012 | Roundtree |
| 2012/0150601 A1 | 6/2012 | Fisher |
| 2012/0184367 A1 | 7/2012 | Parrott et al. |
| 2012/0196586 A1 | 8/2012 | Grigg et al. |
| 2012/0238206 A1 | 9/2012 | Singh et al. |
| 2012/0262281 A1 | 10/2012 | Edwards et al. |
| 2013/0105565 A1 | 5/2013 | Kamprath |
| 2013/0175984 A1 | 7/2013 | Yamazaki et al. |
| 2014/0141718 A1 | 5/2014 | Stromberg et al. |

OTHER PUBLICATIONS

Office Action dated Nov. 4, 2014, U.S. Appl. No. 14/076,164, filed Nov. 8, 2013.

Restriction Requirement dated Jan. 5, 2015, U.S. Appl. No. 13/857,139, filed Apr. 4, 2013.

FAIPP Pre-Interview Communication dated Mar. 2, 2015, U.S. Appl. No. 13/857,138, filed Apr. 4, 2013.

First Action Interview Office Action dated Apr. 20, 2015, U.S. Appl. No. 13/857,138, filed Apr. 4, 2013.

Notice of Allowance dated Mar. 6, 2015, U.S. Appl. No. 14/076,164, filed Nov. 8, 2013.

Cordes, Kevin R., et al., entitled, "Virtual Private Network (VPN) Tunneling in a User Equipment (UE) Brokered by a Radio Frequency Identity (RFID) Chip Communicatively Coupled to the User Equipment," filed Apr. 27, 2015, U.S. Appl. No. 14/696,835.

Cordes, Kevin R., et al., "Digest of Biographical Information for an Electronic Device with Static and Dynamic Portions", filed Apr. 4, 2013, U.S. Appl. No. 13/857,141.

Cordes, Kevin R., et al., "Radio Frequency Identity (RFID) Chip Electrically and Communicatively Coupled to Motherboard of Mobile Communication Device", filed Apr. 4, 2013, U.S. Appl. No. 13/857,139.

Cordes, Kevin R., et al., "System for Managing a Digest of Biographical Information Stored in a Radio Frequency Identity Chip Coupled to a Mobile Communication Device", filed Apr. 4, 2013, U.S. Appl. No. 13/857,138.

Cordes, Kevin R., et al., "Visually Readable Electronic Label", filed Nov. 8, 2013, U.S. Appl. No. 14/076,164.

Cordes, Kevin R., et al., "Autonomous Authentication of a Reader by a Radio Frequency Identity (RFID) Device", filed Feb. 27, 2014, U.S. Appl. No. 14/192,316.

FAIPP Pre-Interview Communication dated Aug. 5, 2015, U.S. Appl. No. 13/857,141, filed Apr. 4, 2013.

FAIPP Pre-Interview Communication dated Jun. 2, 2015, U.S. Appl. No. 13/857,139, filed Apr. 4, 2013.

Notice of Allowance dated Jun. 11, 2015, U.S. Appl. No. 13/857,138, filed Apr. 4, 2013.

Office Action dated Jul. 9, 2015, U.S. Appl. No. 14/732,846, filed Jun. 8, 2015.

Cordes, Kevin R., et al., "Visually Readable Electronic Label," filed Jun. 8, 2015, U.S. Appl. No. 14/732,846.

Office Action dated Nov. 19, 2015, U.S. Appl. No. 13/857,139, filed Apr. 4, 2013.

Notice of Allowance dated Oct. 29, 2015, U.S. Appl. No. 14/732,846, filed Jun. 8, 2015.

Notice of Allowance dated Dec. 17, 2015, U.S. Appl. No. 13/857,141, filed Apr. 4, 2013.

FAIPP Pre-Interview Communication dated Feb. 25, 2016, U.S. Appl. No. 14/192,316, filed Feb. 27, 2014.

FAIPP Pre-Interview Communication dated Dec. 30, 2015, U.S. Appl. No. 14/532,954, filed Nov. 4, 2014.

Cordes, Kevin R., et al., "Digest of Biographical Information for an Electronic Device with Static and Dynamic Portions," filed Mar. 14, 2016, U.S. Appl. No. 15/069,921.

Notice of Allowance dated Mar. 26, 2016, U.S. Appl. No. 13/857,139, filed Apr. 4, 2013.

Notice of Allowance dated Jun. 1, 2016, U.S. Appl. No. 14/192,316, filed Feb. 27, 2014.

Notice of Allowance dated Mar. 24, 2016, U.S. Appl. No. 14/532,954, filed Nov. 4, 2014.

* cited by examiner

PREVENTION OF INDUCTIVE COUPLING BETWEEN COMPONENTS OF A MOBILE COMMUNICATION DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Near Field Communication (NFC) technologies are common in many modern mobile communication devices. Near Field Communication technologies involve non-contact data transfer using inductively coupled electromagnetic fields. Data is transferred to a similar device in close proximity to the mobile communication device. Radio Frequency Identity (RFID) tags can operate without battery power. A Near Field Communication transceiver's electromagnetic field powers a Radio Frequency Identity tag long enough for the tag to transmit short bursts of information.

SUMMARY

In an embodiment, a method of organizing components of a mobile communication device is disclosed. The method comprises orienting a radio frequency identity chip of the mobile communication device relative to a general purpose near field communication transceiver of the mobile communication device, locating the radio frequency identity chip in a null region of an electromagnetic field radiated by the general purpose near field communication transceiver, whereby, the null region of the electromagnetic field may be below a threshold required to activate the radio frequency identity chip.

In another embodiment, a mobile communication device is disclosed. The mobile communication device comprises a general purpose near field communication transceiver, a radio frequency identity chip, and an electromagnetic shield that attenuates the strength of an electromagnetic field radiated by the general purpose near field transceiver that is incident upon the radio frequency identity chip, whereby, the electromagnetic field at the radio frequency identity chip may be below a threshold required to activate the radio frequency identity chip.

In another embodiment, a method for unlocking and engaging a radio frequency identity chip of a mobile device is disclosed. The method comprises receiving a signal on the radio frequency identity chip to unlock, unlocking the radio frequency identity chip, engaging the radio frequency identity chip with a near field communication scanner, transmitting a biographical digest from the radio frequency identity chip to the near field communication scanner, and locking the radio identity frequency chip.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
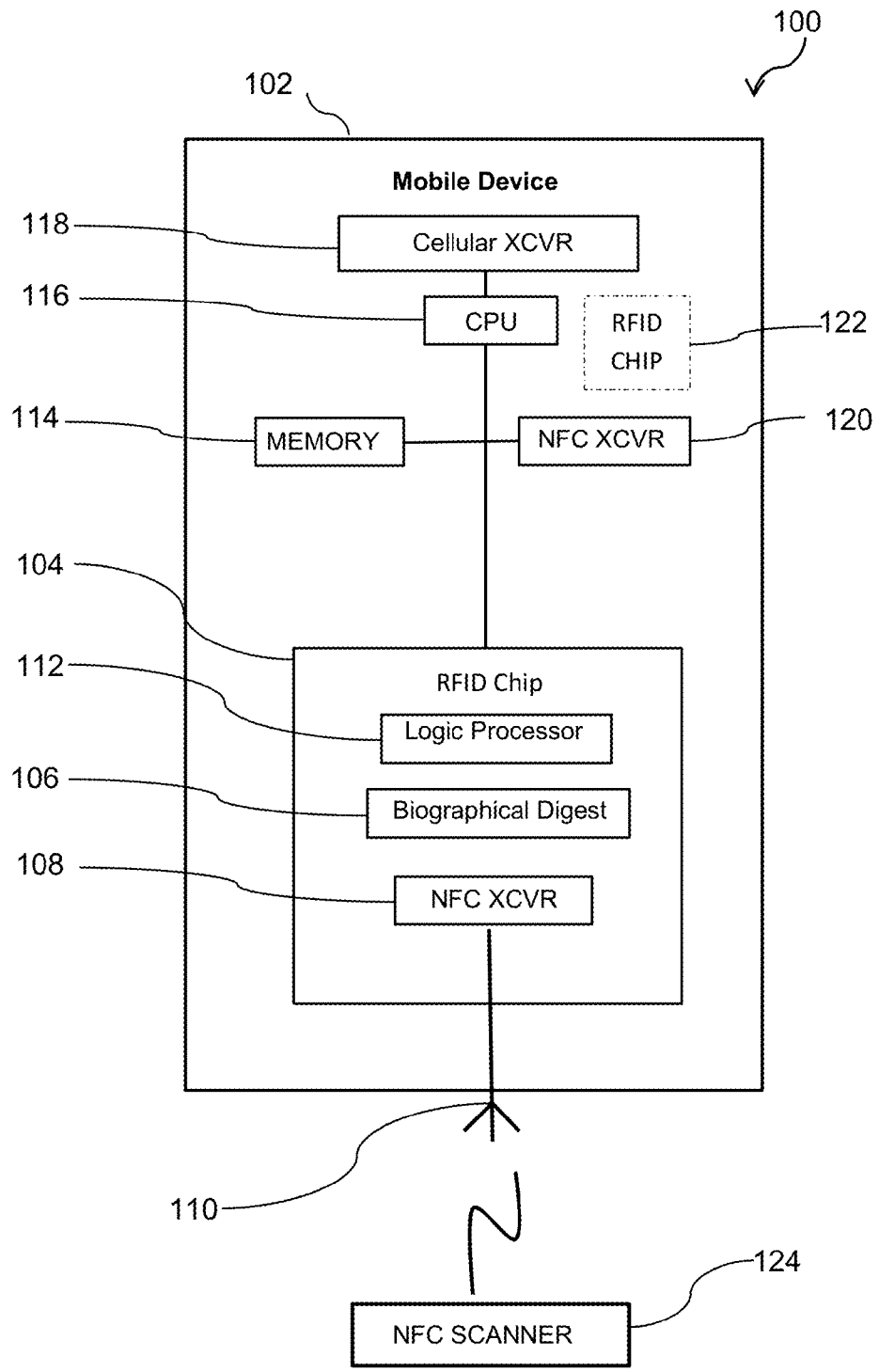
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The presence of a radio frequency identity (RFID) chip on a mobile communication device with a near field communication (NFC) transceiver gives rise to issues. The NFC transceiver may discover the RFID chip and deliver power to the RFID chip through an electromagnetic field. The RFID chip may then transmit a biographical digest, made up of both static and dynamic data. For further details on a biographical digest of information stored in an RFID chip, see U.S. patent application Ser. No. 13/857,141, filed Apr. 4, 2013, entitled "Digest of Biographical Information for an Electronic Device with Static and Dynamic Portions," by Kevin R. Cordes, et al., which is incorporated herein by reference in its entirety. For further details on managing a biographical digest of information stored in an RFID chip, see U.S. patent application Ser. No. 13/857,138, filed Apr. 4, 2013, entitled "System For Managing a Digest of Biographical Information Stored in a Radio Frequency Identity Chip Coupled to a Mobile Communication Device," by Kevin R. Cordes, et al., which is incorporated herein by reference in its entirety. After the RFID chip transmits the biographical data it may power down. However, the NFC transceiver would again power on the RFID chip and the cycle would continue until the battery of the phone depleted.

NFC is a standard of communication for devices that are in close proximity. A radio communication link is established between the devices and data exchange may occur. It is also possible for one of the devices to be unpowered, referred to as a tag. The electromagnetic field radiated by a device can deliver enough power for a tag, otherwise unpowered, to send and receive bursts of data. The crossing over of one device's electromagnetic field through another device is called inductive coupling. General purpose NFC transceivers found on a mobile communication device have simple logic that may deliver power to any RFID tag in close proximity. A mobile communication device may have multiple tags and transceivers mounted to the mobile communication device's case and circuitry. The placement of an NFC transceiver in close proximity to an RFID tag can result in continuous communication and shortened battery life for the mobile communication device. For further details on the electrical and communicative coupling of an RFID chip to the motherboards of a mobile communication device, see U.S. patent application Ser. No. 13/857,139, filed Apr. 4, 2013, entitled "Radio Frequency Identity (RFID) Chip Electrically and Communicatively Coupled to Motherboard of Mobile Communication Device," by Kevin R. Cordes, et al., which is incorporated herein by reference in its entirety.

The electromagnetic field radiated by the NFC transceiver can be attenuated and prevented from reaching a threshold that would cause the RFID tag to power on, preventing inductive coupling. Additionally, logic within the RFID tag can provide a way to prevent unwanted inductive coupling, for example preventing the RFID tag from answering a discovery query or responding to a discovery signal emitted by the NFC transceiver. The RFID tag can be shielded from the electromagnetic field generated by the NFC transceiver. Antenna design of the RFID chip can create null regions or weak lobes within an electromagnetic field where the strength of the electromagnetic field is reduced, and the physical orientation of the RFID chip can be configured to direct a null region towards the NFC transceiver. Once inductive coupling with the NFC transceiver is prevented, the RFID tag can be further configured so that inductive coupling with an NFC scanner is possible. Inductive coupling can be reduced by placement of electromagnetic shielding between the NFC scanner and the RFID chip.

The RFID tag may be located in or on the mobile communication device so as to minimize or reduce the electromagnetic field radiated by the NFC transceiver that is incident upon the RFID tag and/or an antenna of the RFID tag. The package of the mobile communication device may be shaped to minimize or reduce the electromagnetic field radiated by the NFC transceiver that is incident upon the RFID tag and/or an antenna of the RFID tag.

The prevention of inductive coupling between an NFC transceiver and RFID tag of a mobile communication device described above can provide a number of advantages. The prevention of inductive coupling keeps the NFC transceiver from continuously reading an RFID tag attached to the same mobile communication device. Both the NFC transceiver and the RFID tag are freed up to communicate with intended exterior devices. Battery life of the mobile communication device may be conserved. The prevention of inductive coupling also allows the RFID tag to be selective of exterior NFC scanners. The ability to be selective of exterior scanners allows only approved NFC scanners to communicate with the RFID tag and effectively with the mobile communication device. These technologies and tools may be extended in an embodiment to allow selection by a user of exterior scanners to communicate with the RFID tag from a user interface screen or window presented on a display of the mobile communication device. Likewise, a user interface screen or window may be presented on the display of the mobile communication device to approve/disapprove unlocking or locking of the RFID tag for communicating with exterior NFC scanners.

Turning now to FIG. 1, a system 100 is described. In an embodiment, system 100 comprises a mobile communication device 102. The mobile communication device 102 comprises a radio frequency identity (RFID) chip 104 that comprises a biographical digest 106, a near field communication (NFC) transceiver 108, an RFID antenna 110, and a logic processor 112. In an embodiment, the RFID chip 104 is connected or communicatively coupled to a mother board or circuit board of the mobile communication device 102 and is connected or communicatively coupled to one or more of a memory bus, a data bus, and/or an address bus of the mother board. The mobile communication device 102 may further comprise a memory 114, a central processing unit (CPU) 116, a cellular transceiver 118, and a general purpose near field communication transceiver 120. The general purpose NFC transceiver 120 may be used for completing point-of-sale (POS) transactions, for obtaining access to a building via a handshake with an electronic entry scanner, for paying mass transit system fares, and for other transactions or exchanges of confidential information associated with application layer functionality visible to a user of the mobile communication device 102.

In an embodiment, the RFID chip 104 that is connected or communicatively coupled to the mother board or circuit board of the device 102 is not present and instead the mobile device 102 further comprises an isolated radio frequency identity chip 122. The isolated RFID chip 122 may be adhered to an outer or inner surface of the package of the device 102 and/or retained by a component of the device 102, for example retained by a control button. The isolated RFID chip 122 has an internal structure substantially like that of the RFID chip 104. The isolated RFID chip 122 may have a processor, a biographical digest, a near field communication transceiver, and an antenna substantially similar to the corresponding components in the RFID chip 104. It is understood that the description of the functionality of the RFID chip 104 below applies substantially to the isolated RFID chip 122, and where there are substantive differences with the function and/or configuration of the RFID chip 104, these differences are described separately for the isolated RFID chip 122.

In an embodiment, the biographical digest 106 comprises information about the mobile communication device 102, for example a manufacturer identity, a device model identity, an initial hardware version identity, an initial software version identity, an initial preferred roaming list identity, a current software version identity, a current preferred roaming list identity, and other information about the device 102. The biographical digest 106 may be stored in a memory portion of the RFID chip 104; for example, a semiconductor memory portion.

Data may be read from the RFID chip 104 and/or the isolated RFID chip 122 by an NFC scanner 124. The NFC scanner 124 may extract the biographical digest 106. Alternatively, the NFC scanner 124 may provide the biographical digest 106 to a computer (not shown). Computer systems are described in detail hereinafter.

The mobile communication device 102 may be any of a mobile phone, a personal digital assistant (PDA), a media player, a laptop computer, a notebook computer, a tablet computer, a removable wireless interface component, a head unit or telematics unit configured for installation into a vehicle, or other mobile communication device. The NFC scanner 124 may be implemented as a computer.

Figure 2:
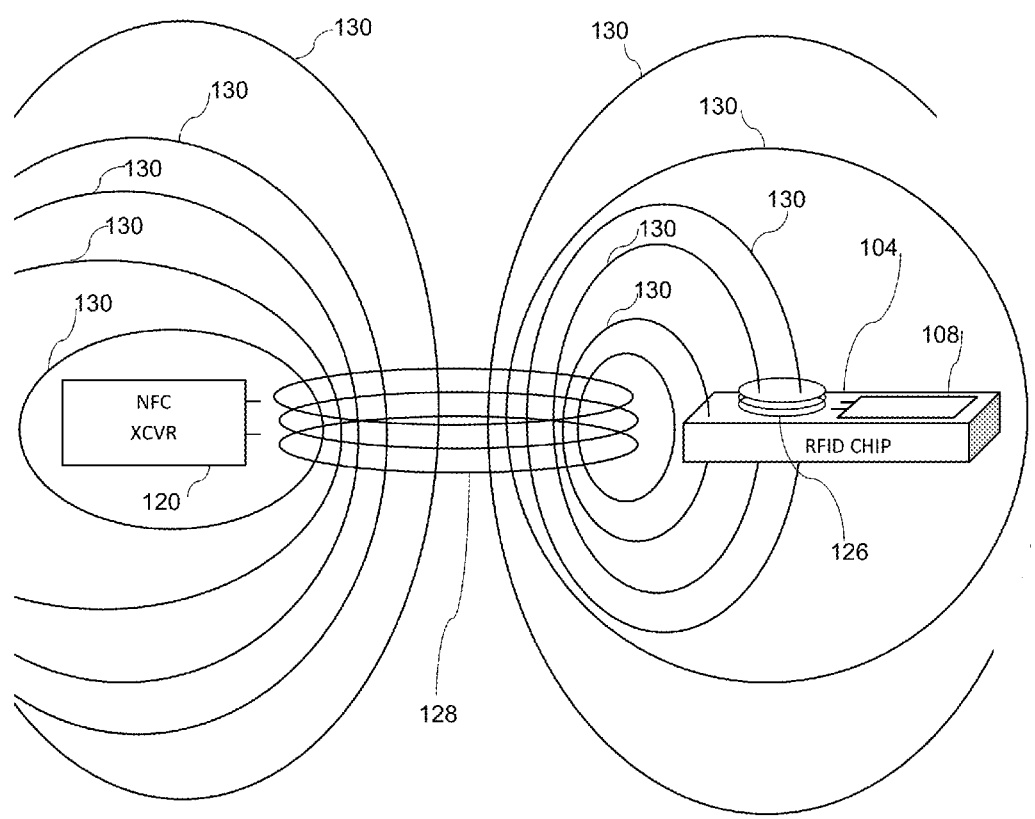
FIG. 2 is an illustration of components of a mobile communication device according to an embodiment of the disclosure.

Turning now to FIG. 2, further details of the mobile communication device 102 are illustrated. In one embodiment, the RFID chip 104 comprises an NFC transceiver 108 and an antenna 126. An RFID system is typically made up of two parts: a transponder located on the device to be identified and a scanner on the device that is reading or writing. The general purpose NFC transceiver 120 may behave as a transponder as well as a scanner. In one embodiment, the general purpose NFC transceiver 120 may comprise a radiating antenna 128. The radiating antenna 128 may radiate an electromagnetic field 130. The electromagnetic field 130 may inductively couple the general purpose NFC transceiver 120 to the RFID chip 104. As a result, the general purpose NFC transceiver 120 may act as a scanner, causing the RFID chip 104 to act as a transponder.

Inductively coupled transponders may operate passively. Due to their passive nature, inductively coupled transponders need energy provided from the scanner. A portion of the electromagnetic field 130 radiated from the scanner passes through the antenna 126 of the transponder. In one embodiment, the general purpose NFC transceiver 120 may provide power to the RFID chip 104 through the electromagnetic field 130. The RFID chip 104 and the general purpose NFC transceiver 120 may then transmit and receive data. In one embodiment, the transmitting and receiving of data between the RFID chip 104 and the general purpose NFC transceiver 120 may result in continuous communication. Continuous communication may block the RFID chip 104 and the NFC transceiver 120 from communicating with other devices. Continuous communication may also result in shortened battery life of a device. Continuous communication between the RFID chip 104 and the NFC transceiver 120 may not be desirable for some embodiments of a mobile communication device.

Figure 3:
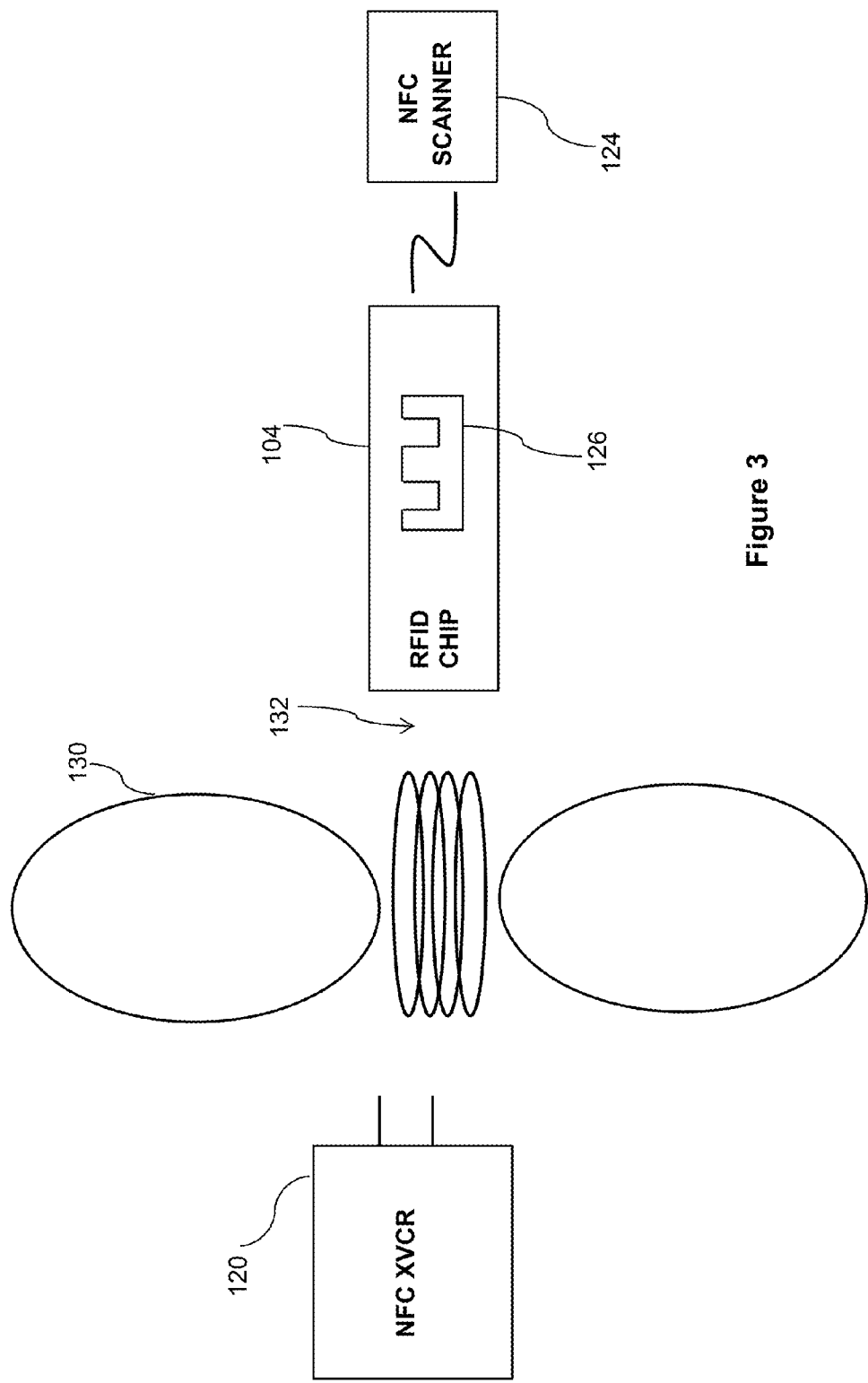
FIG. 3 is another illustration of components of a mobile communication device according to an embodiment of the disclosure.

Turning now to FIG. 3, further details of the RFID chip 104 are illustrated. The electromagnetic field 130 comprises null regions 132. A null region 132 may experience reduced influence from the electromagnetic field 130. In another embodiment of the disclosure, an RFID chip 104 may be oriented and located in a null region 132 of the electromagnetic field 130. The reduced influence of the electromagnetic field 130 may fall below a threshold required to activate the RFID chip 104. As a result, the RFID chip 104 would not transmit or receive any data from the general purpose NFC transceiver 120. The RFID chip 104 may further comprise an antenna 126 configured to further attenuate the electromagnetic field 130. For example, the antenna 126 may be configured to have directional radiation and receiving properties, and the antenna 126 may be installed in an orientation that aligns a null of the antenna 126 with the null regions 132.

In the same orientation and location described in FIG. 3, the RFID chip 104 may be detected by the NFC scanner 124 from FIG. 1. The RFID chip 104 may be influenced by the energy from the NFC scanner 124. As a result, the RFID chip 104 may transmit data, such as a biographical digest, to the NFC scanner 124 while preventing inductive coupling with the general purpose NFC transceiver 120.

Figure 4:
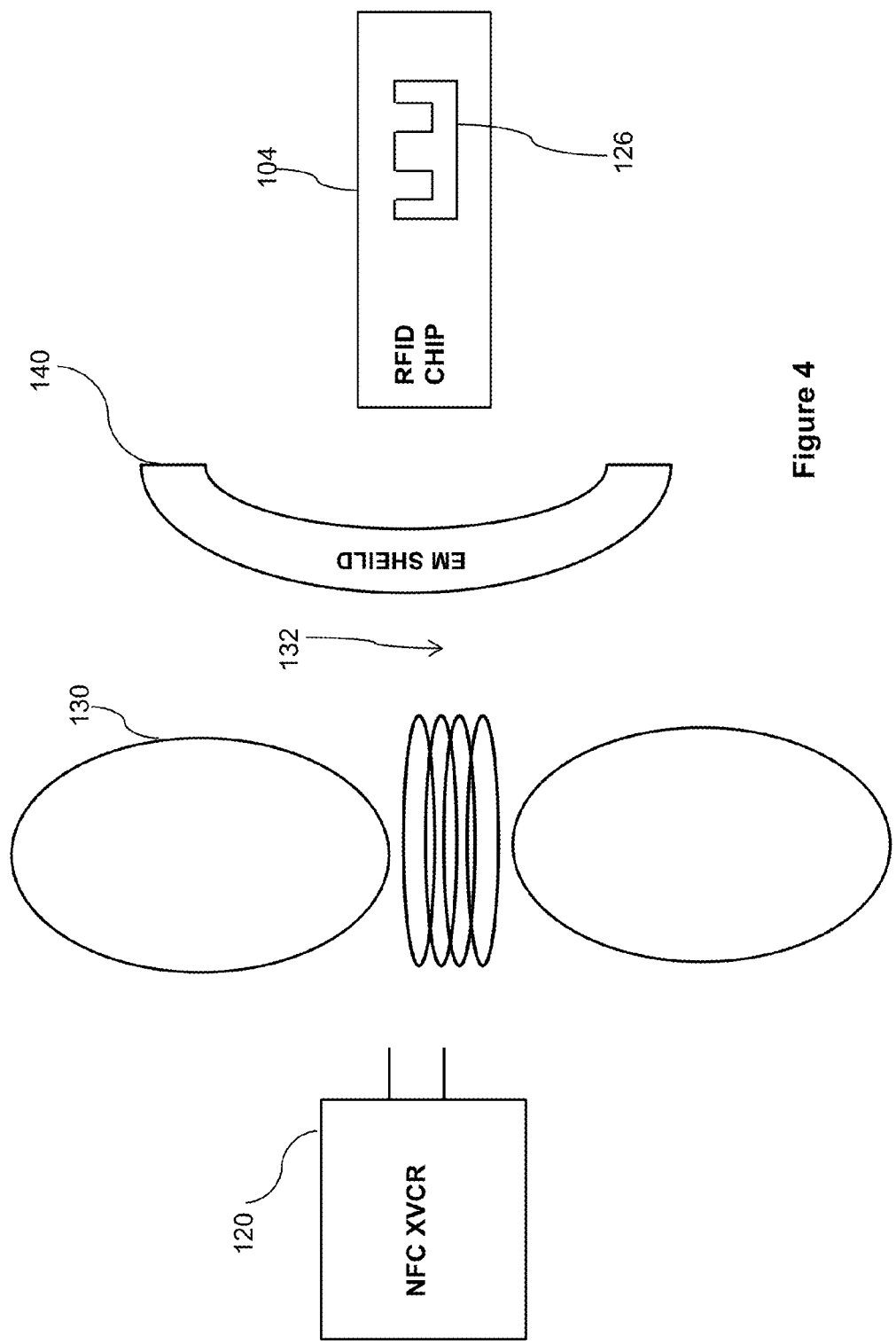
FIG. 4 is yet another illustration of components of a mobile communication device according to an embodiment of the disclosure.

Turning now to FIG. 4, further details of the RFID chip 104 are illustrated. In an embodiment, the general purpose NFC transceiver 120 may comprise an electromagnetic field 130 that may pass through the RFID chip 104. However, the mobile communication device 102 may further comprise an electromagnetic shield 140. The electromagnetic shield 140 may comprise conductive or magnetic materials. The electromagnetic shield 140 may attenuate the strength of the electromagnetic field 130 that is incident upon the RFID chip 104 while allowing fields radiated from a different direction to be unattenuated at the RFID chip 104, for example a field radiated by the NFC scanner 124. In another embodiment, the RFID chip 104 may further comprise an antenna 126 configured to further attenuate the electromagnetic field 130.

In one embodiment, the electromagnetic shield 140 may be coupled to an internal circuit board of the mobile communication device 102. In another embodiment, the electromagnetic shield 140 may be coupled to the interior portion of a rear shell or cover of the mobile communication device 102. The electromagnetic shield 140 may reduce the electromagnetic field 130 below a threshold required to activate the RFID chip 104. In another embodiment, the geometry of the antenna 126 on the RFID chip 104 may further attenuate the strength of the electromagnetic field 130. As a result, the electromagnetic shield 140 may contribute to preventing inductive coupling between the general purpose NFC transceiver 120 and the RFID chip 104.

Figure 5:
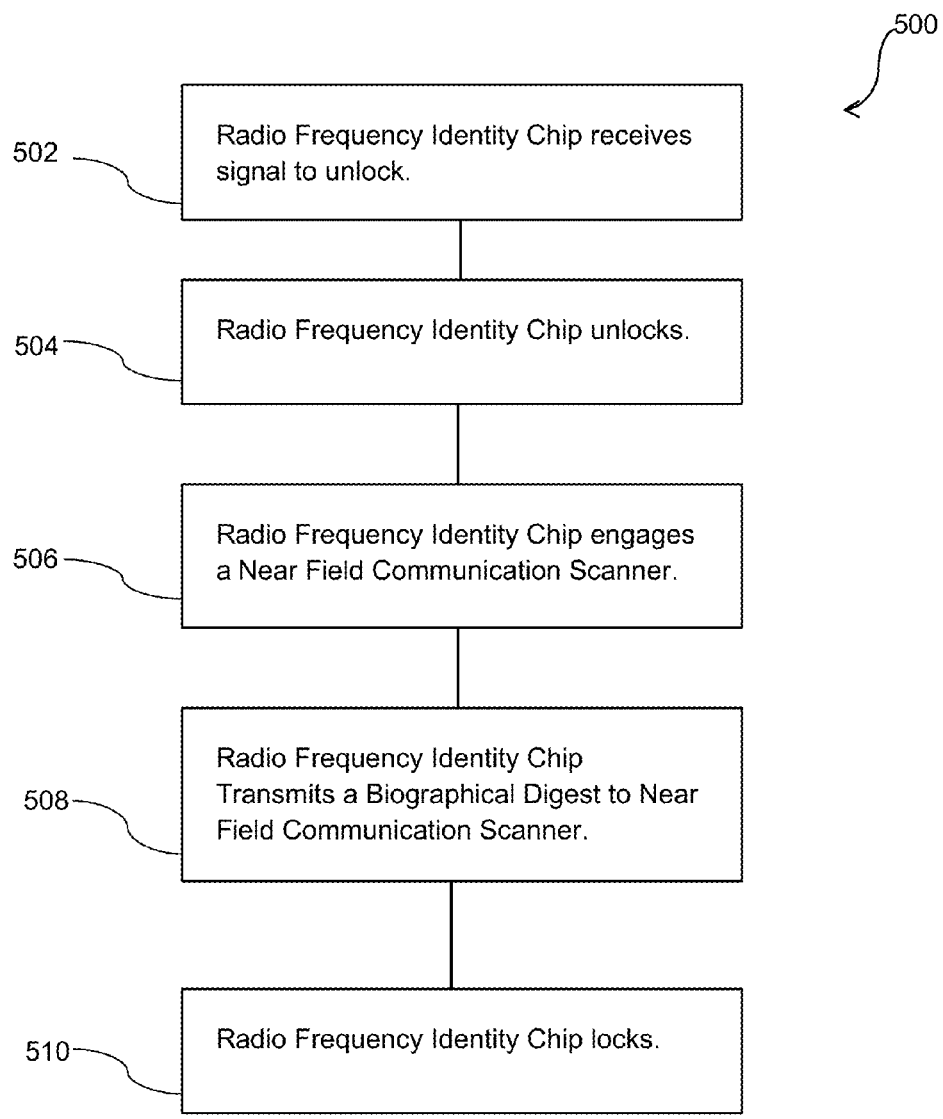
FIG. 5 is a flow chart of a method according to an embodiment of the disclosure.

FIG. 5 shows a flow chart of a method 500 for unlocking and engaging an RFID chip of a mobile communication device. The RFID chip may be the same as described in FIG. 1 as RFID chip 104. The mobile communication device may be the same as described in FIG. 1 as mobile communication device 102. In one embodiment of method 500, an NFC scanner may use a non-standard modification of initialization procedures prior to use of a transport protocol to unlock the RFID chip. In another embodiment, method 500 may begin with block 502. At block 502, an unlock signal may be received by the RFID chip.

In one embodiment, the unlock signal may be encrypted. In another embodiment, the unlock signal and a biographical digest may be sent on different frequencies. In yet another embodiment, the unlock signal may be sent using a plurality of transport medias. A transport media may be defined as any method of transmitting and receiving electronic data. Examples of transport media may comprise RF, wired, electromagnetic, and any proprietary methods of data transfer. There are many other forms of transport media not listed in the examples above. Each form of transport media, whether listed in the examples above or not listed, are understood to be part of the disclosure and considered a method for communicating signals to the RFID chip. The transport media used to receive the unlock signal may be different than the transport media used by the general purpose NFC transceiver of the mobile communication device.

At block 504, the RFID chip unlocks. Once the RFID chip has unlocked, the RFID chip may continue using standard protocols so that a plurality of standard NFC scanners may transmit and receive data with the RFID chip. At block 506, the RFID chip engages an NFC scanner. In one embodiment, the NFC scanner is always external to the mobile communication device. A general purpose NFC transceiver of the mobile communication device may not have access to the unlock algorithm and is not a consideration for the RFID chip. In another embodiment, the general purpose NFC transceiver of the mobile communication device may communicate with the RFID chip. The RFID chip may transmit a message to the general purpose NFC transceiver to ignore the RFID chip in the future. In yet another embodiment, the general purpose NFC transceiver of the mobile communication device may contain logic to prevent inductive coupling with the RFID chip. The logic may comprise hardware, software, or any type of proprietary algorithm.

In one embodiment, at block 508, the RFID chip only transmits a biographical digest to the NFC scanner. In another embodiment, at block 508, the RFID chip may transmit a biographical digest to the NFC scanner as well as receive data from the NFC scanner. At block 510, the RFID chip locks. In one embodiment, the RFID chip does not transmit or receive data while locked. Method 500 is complete after block 510. The RFID chip may wait for another unlock signal. Another unlock signal would begin method 500 at block 502 again.

In an embodiment, when the RFID chip 104 unlocks, a message is conveyed to the central processing unit 116, and an application executed by the central processing unit 116 presents a message or notification in a display of the mobile communication device 102 about the unlocking of the RFID chip 104. In an embodiment, the application executed by the central processing unit 116 may prompt the user to approve unlocking the RFID chip 104 before allowing the RFID chip 104 to unlock. In an embodiment, the application executed by the central processing unit 116 may present a message or notification in a display of the mobile communication device 102 after transmitting the biographical digest from the RFID chip 104 to the near field communication scanner 124 and before locking the RFID chip 104. Additionally, in an embodiment, the application executed by the central processing unit 116 may present a message prompting a user to select locking the RFID chip 104 and does not lock the RFID chip 104 until the user has commanded the RFID chip 104 to be locked.

Figure 6:
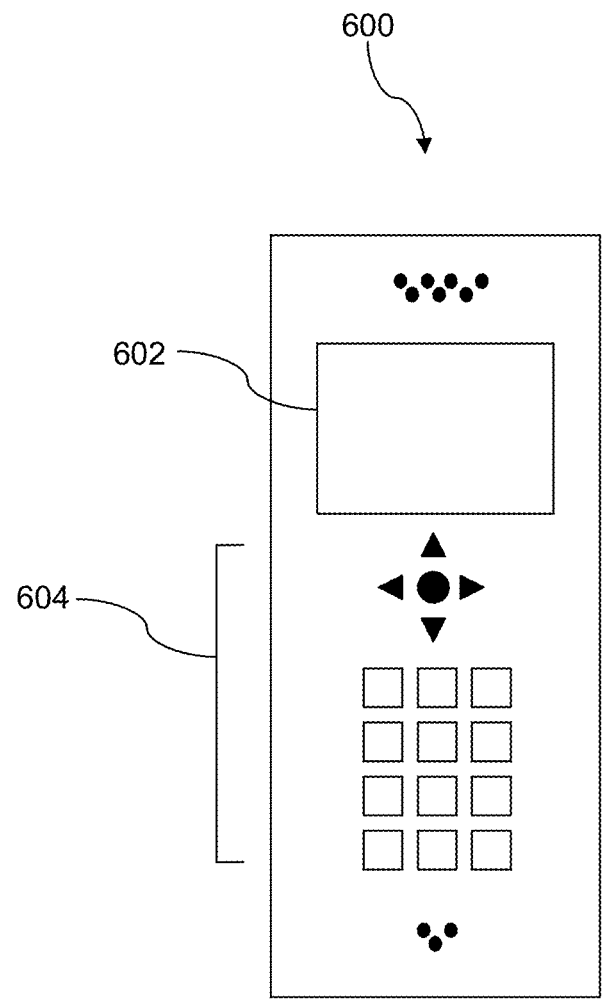
FIG. 6 is an illustration of a mobile communication device according to an embodiment of the disclosure.

FIG. 6 depicts the mobile communication device 600, which is operable for implementing aspects of the present disclosure, but the present disclosure should not be limited to these implementations. Though illustrated as a mobile phone, the mobile communication device 600 may take various forms including a wireless handset, a pager, a personal digital assistant (PDA), a gaming device, or a media player. The mobile communication device 600 includes a display 602 and a touch-sensitive surface and/or keys 604 for input by a user. The mobile communication device 600 may present options for the user to select, controls for the user to actuate, and/or cursors or other indicators for the user to direct. The mobile communication device 600 may further accept data entry from the user, including numbers to dial or various parameter values for configuring the operation of the handset. The mobile communication device 600 may further execute one or more software or firmware applications in response to user commands. These applications may configure the mobile communication device 600 to perform various customized functions in response to user interaction. Additionally, the mobile communication device 600 may be programmed and/or configured over-the-air, for example from a wireless base station, a wireless access point, or a peer mobile communication device 600. The mobile communication device 600 may execute a web browser application which enables the display 602 to show a web page. The web page may be obtained via wireless communications with a base transceiver station, a wireless network access node, a peer mobile communication device 600 or any other wireless communication network or system.

Figure 7:
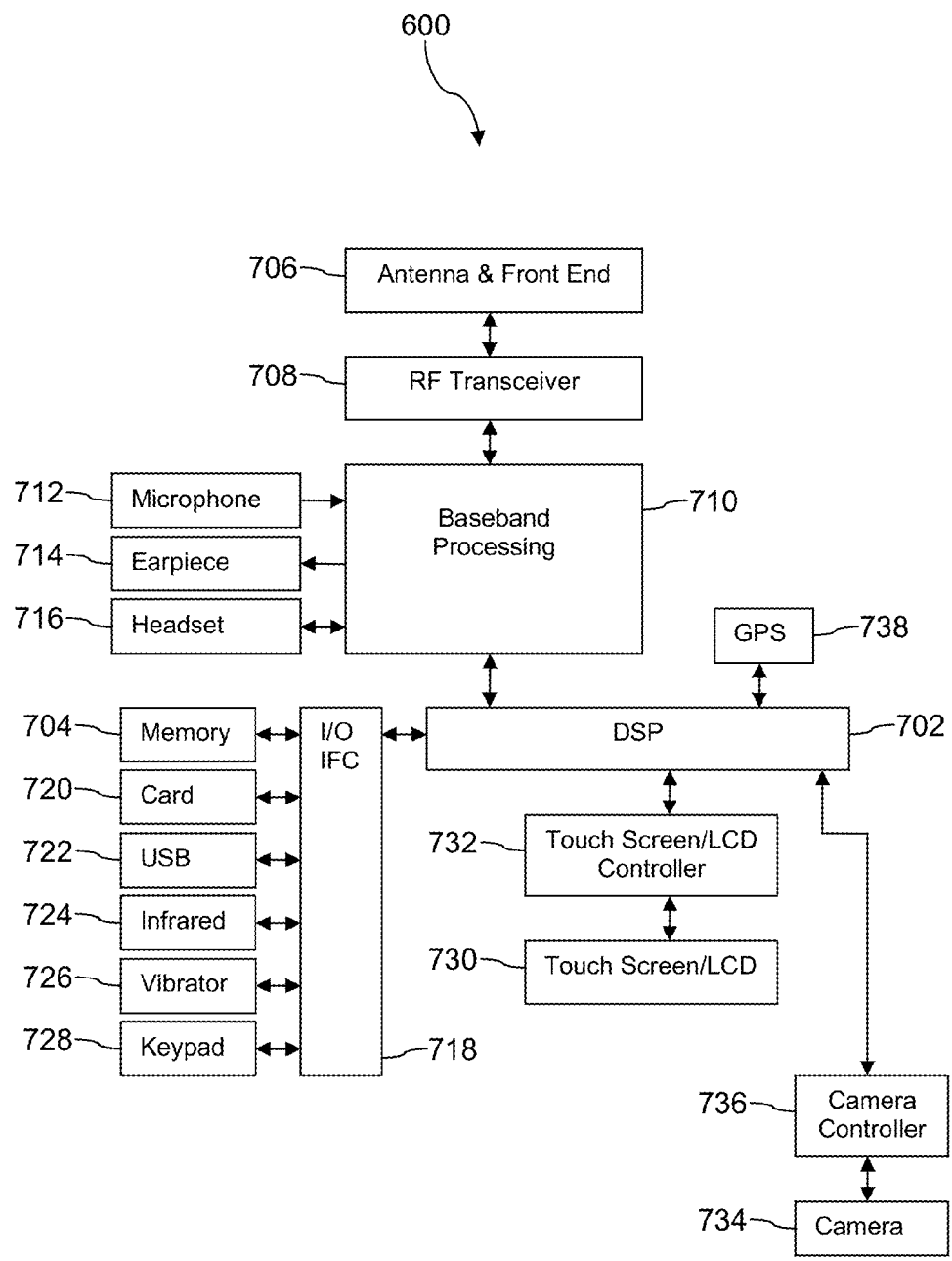
FIG. 7 is a block diagram of a hardware architecture of a mobile communication device according to an embodiment of the disclosure.

FIG. 7 shows a block diagram of the mobile communication device 600. While a variety of known components of handsets are depicted, in an embodiment a subset of the listed components and/or additional components not listed may be included in the mobile communication device 600. The mobile communication device 600 includes a digital signal processor (DSP) 702 and a memory 704. As shown, the mobile communication device 600 may further include an antenna and front end unit 706, a radio frequency (RF) transceiver 708, a baseband processing unit 710, a microphone 712, an earpiece speaker 714, a headset port 716, an input/output interface 718, a removable memory card 720, a universal serial bus (USB) port 722, an infrared port 724, a vibrator 726, a keypad 728, a touch screen liquid crystal display (LCD) with a touch sensitive surface 730, a touch screen/LCD controller 732, a camera 734, a camera controller 736, and a global positioning system (GPS) receiver 738. In an embodiment, the mobile communication device 600 may include another kind of display that does not provide a touch sensitive screen. In an embodiment, the DSP 702 may communicate directly with the memory 704 without passing through the input/output interface 718. Additionally, in an embodiment, the mobile communication device 600 may comprise other peripheral devices that provide other functionality.

The DSP 702 or some other form of controller or central processing unit operates to control the various components of the mobile communication device 600 in accordance with embedded software or firmware stored in memory 704 or stored in memory contained within the DSP 702 itself. In addition to the embedded software or firmware, the DSP 702 may execute other applications stored in the memory 704 or made available via information carrier media such as portable data storage media like the removable memory card 720 or via wired or wireless network communications. The application software may comprise a compiled set of machine-readable instructions that configure the DSP 702 to provide the desired functionality, or the application software may be high-level software instructions to be processed by an interpreter or compiler to indirectly configure the DSP 702.

The DSP 702 may communicate with a wireless network via the analog baseband processing unit 710. In some embodiments, the communication may provide Internet connectivity, enabling a user to gain access to content on the Internet and to send and receive e-mail or text messages. The input/output interface 718 interconnects the DSP 702 and various memories and interfaces. The memory 704 and the removable memory card 720 may provide software and data to configure the operation of the DSP 702. Among the interfaces may be the USB port 722 and the infrared port 724. The USB port 722 may enable the mobile communication device 600 to function as a peripheral device to exchange information with a personal computer or other computer system. The infrared port 724 and other optional ports such as a Bluetooth® interface or an IEEE 802.11 compliant wireless interface may enable the mobile communication device 600 to communicate wirelessly with other nearby handsets and/or wireless base stations.

The keypad 728 couples to the DSP 702 via the interface 718 to provide one mechanism for the user to make selections, enter information, and otherwise provide input to the mobile communication device 600. Another input mechanism may be the touch screen LCD 730, which may also display text and/or graphics to the user. The touch screen LCD controller 732 couples the DSP 702 to the touch screen LCD 730. The GPS receiver 738 is coupled to the DSP 702 to decode global positioning system signals, thereby enabling the mobile communication device 600 to determine its position.

Figure 8A:
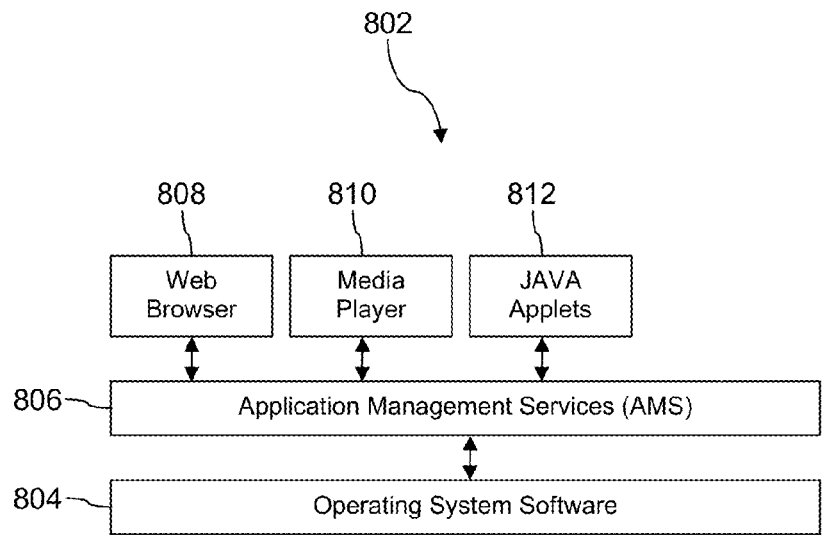
FIG. 8A is a block diagram of a software architecture of a mobile communication device according to an embodiment of the disclosure.

FIG. 8A illustrates a software environment 802 that may be implemented by the DSP 702. The DSP 702 executes operating system software 804 that provides a platform from which the rest of the software operates. The operating system software 804 may provide a variety of drivers for the handset hardware with standardized interfaces that are accessible to application software. The operating system software 804 may be coupled to and interact with application management services (AMS) 806 that transfer control between applications running on the mobile communication device 600. Also shown in FIG. 8A are a web browser application 808, a media player application 810, and JAVA applets 812. The web browser application 808 may be executed by the mobile communication device 600 to browse content and/or the Internet, for example when the mobile communication device 600 is coupled to a network via a wireless link. The web browser application 808 may permit a user to enter information into forms and select links to retrieve and view web pages. The media player application 810 may be executed by the mobile communication device 600 to play audio or audiovisual media. The JAVA applets 812 may be executed by the mobile communication device 600 to provide a variety of functionality including games, utilities, and other functionality.

Figure 8B:
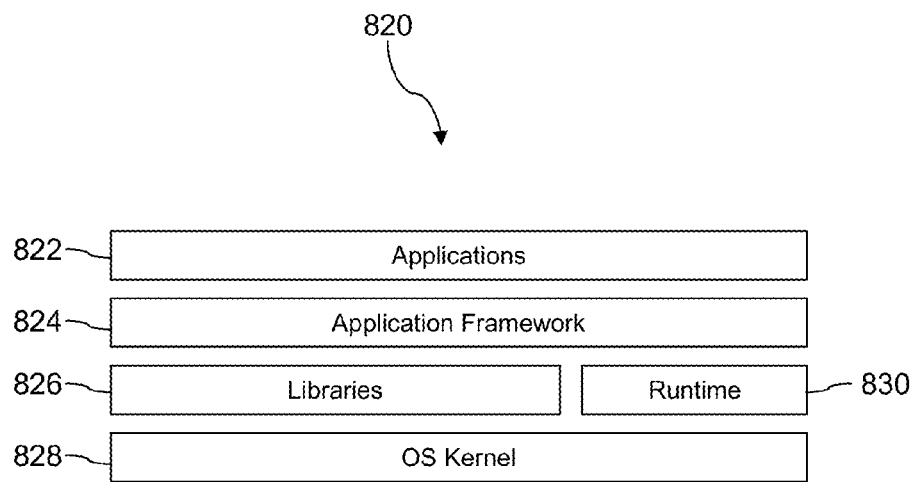
FIG. 8B is another block diagram of a software architecture of a mobile communication device according to an embodiment of the disclosure.

FIG. 8B illustrates an alternative software environment 820 that may be implemented by the DSP 702. The DSP 702 executes operating system software 828 (for example an operating system kernel) and an execution runtime 830. The DSP 702 executes applications 822 that may execute in the execution runtime 830 and may rely upon services provided by the application framework 824. Applications 822 and the application framework 824 may rely upon functionality provided via the libraries 826.

Figure 9:
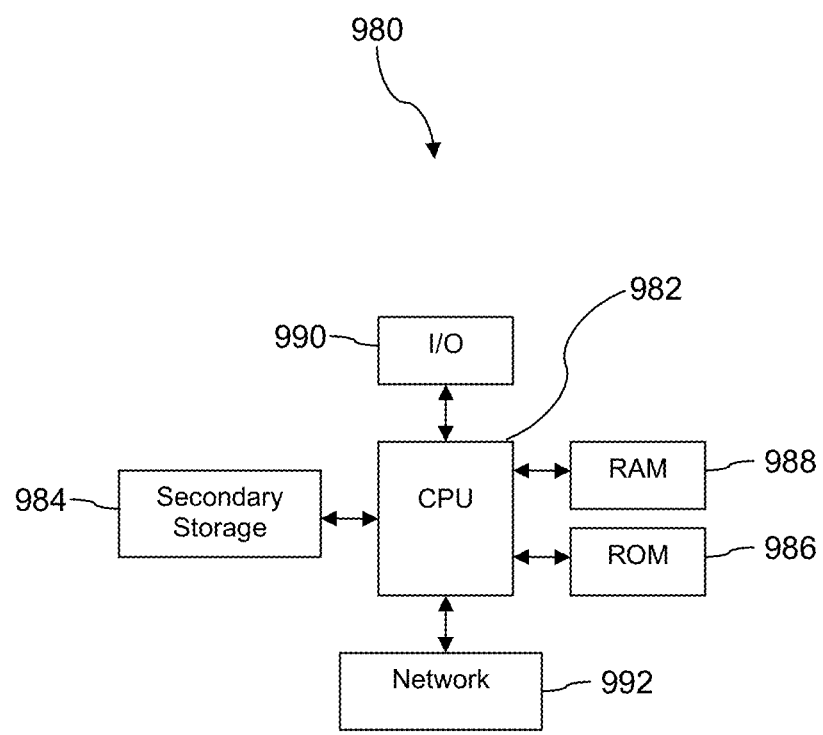
FIG. 9 is a block diagram of a computer system according to an embodiment of the disclosure.

FIG. 9 illustrates a computer system 980 suitable for implementing one or more embodiments disclosed herein. The computer system 980 includes a processor 982 (which may be referred to as a central processor unit or CPU) that is in communication with memory devices including secondary storage 984, read only memory (ROM) 986, random access memory (RAM) 988, input/output (I/O) devices 990, and network connectivity devices 992. The processor 982 may be implemented as one or more CPU chips.

It is understood that by programming and/or loading executable instructions onto the computer system 980, at least one of the CPU 982, the RAM 988, and the ROM 986 are changed, transforming the computer system 980 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware; for example, in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 984 is typically comprised of one or more disk drives or tape drives and is used for non-volatile storage of data and as an over-flow data storage device if RAM 988 is not large enough to hold all working data. Secondary storage 984 may be used to store programs which are loaded into RAM 988 when such programs are selected for execution. The ROM 986 is used to store instructions and perhaps data which are read during program execution. ROM 986 is a non-volatile memory device which typically has a small memory capacity relative to the larger memory capacity of secondary storage 984. The RAM 988 is used to store volatile data and perhaps to store instructions. Access to both ROM 986 and RAM 988 is typically faster than to secondary storage 984. The secondary storage 984, the RAM 988, and/or the ROM 986 may be referred to in some contexts as computer readable storage media and/or non-transitory computer readable media.

I/O devices 990 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 992 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 992 may enable the processor 982 to communicate with the Internet or one or more intranets. With such a network connection, it is contemplated that the processor 982 might receive information from the network, or might output information to the network in the course of performing the above-described method steps. Such information, which is often represented as a sequence of instructions to be executed using processor 982, may be received from and outputted to the network, for example, in the form of a computer data signal embodied in a carrier wave.

Such information, which may include data or instructions to be executed using processor 982 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 982 executes instructions, codes, computer programs, scripts which it accesses from hard disk, floppy disk, optical disk (these various disk based systems may all be considered secondary storage 984), ROM 986, RAM 988, or the network connectivity devices 992. While only one processor 982 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 984, for example, hard drives, floppy disks, optical disks, and/or other device, the ROM 986, and/or the RAM 988 may be referred to in some contexts as non-transitory instructions and/or non-transitory information.

In an embodiment, the computer system 980 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 980 to provide the functionality of a number of servers that is not directly bound to the number of computers in the computer system 980. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 980, at least portions of the contents of the computer program product to the secondary storage 984, to the ROM 986, to the RAM 988, and/or to other non-volatile memory and volatile memory of the computer system 980. The processor 982 may process the executable instructions and/or data structures in part by directly accessing the computer program product, for example by reading from a CD-ROM disk inserted into a disk drive peripheral of the computer system 980. Alternatively, the processor 982 may process the executable instructions and/or data structures by remotely accessing the computer program product, for example by downloading the executable instructions and/or data structures from a remote server through the network connectivity devices 992. The computer program product may comprise instructions that promote the loading and/or copying of data, data structures, files, and/or executable instructions to the secondary storage 984, to the ROM 986, to the RAM 988, and/or to other non-volatile memory and volatile memory of the computer system 980.

In some contexts, the secondary storage 984, the ROM 986, and the RAM 988 may be referred to as a non-transitory computer readable medium or a computer readable storage media. A dynamic RAM embodiment of the RAM 988, likewise, may be referred to as a non-transitory computer readable medium in that while the dynamic RAM receives electrical power and is operated in accordance with its design, for example during a period of time during which the computer 980 is turned on and operational, the dynamic RAM stores information that is written to it. Similarly, the processor 982 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for unlocking and engaging a radio frequency identity chip of a mobile communication device, comprising:
   receiving a signal on the radio frequency identity (RFID) chip to unlock;
   responsive to receiving the signal, unlocking the RFID chip;
   responsive to unlocking the RFID chip, engaging the RFID chip with a near field communication (NFC) scanner, wherein the NFC scanner is a general purpose NFC transceiver of the mobile communication device;
   transmitting a biographical digest from the RFID chip to the NFC scanner; and
   subsequent to the transmission of the biographical digest, instructing, by the RFID chip, the general purpose NFC transceiver to ignore the RFID chip and locking the RFID chip.

2. The method of claim 1, wherein the signal received by the RFID chip to unlock is encrypted.

3. The method of claim 1, wherein the NFC scanner uses a non-standard modification of initialization procedures prior to use of a transport protocol to unlock the RFID chip.

4. The method of claim 1, wherein the RFID chip does not transmit while locked.

5. The method of claim 1, wherein the signal received by the RFID chip to unlock and the biographical digest transmitted from the RFID chip to the NFC scanner use a plurality of frequencies.

6. The method of claim 1, wherein the signal received by the RFID chip to unlock uses a different transport media than that used by the general purpose NFC transceiver.

7. The method of claim 6, wherein the different transport media comprises one of radio frequency, wired, or electromagnetic.

8. The method of claim 1, wherein the mobile communication device is one of a mobile phone, a smart phone, a personal digital assistant, a media player, a laptop computer, a notebook computer, or a tablet computer.

9. The method of claim 1, further comprising:
- receiving another signal on the radio frequency identity (RFID) chip to unlock;
- responsive to receiving the other signal, unlocking the RFID chip;
- responsive to unlocking the RFID chip, engaging the RFID chip with a NFC scanner external to the mobile communication device;
- transmitting the biographical digest from the RFID chip to the external NFC scanner; and
- subsequent to the transmission of the biographical digest, locking the RFID chip.

10. The method of claim 1, further comprising receiving, by the RFID chip, data from the NFC scanner in response to unlocking the RFID chip.

11. The method of claim 1, wherein the RFID chip does not transmit or receive data while locked.

12. The method of claim 1, further comprising transmitting a message to a central processing unit in response to unlocking the RFID chip.

13. The method of claim 12, further comprising presenting, by an application executed by the central processing unit, the message in a display of the mobile communication device.

14. The method of claim 13, further comprising prompting, by the application, a user of the mobile communication device to approve the unlocking of the RFID chip before the RFID chip is unlocked.

15. The method of claim 1, further comprising presenting, by an application executed by a central processing unit, a message in a display of the mobile communication device after the transmission of the biographical digest and before the locking of the RFID chip.

16. The method of claim 15, further comprising prompting, by the application, a user of the mobile communication device to approve the locking of the RFID chip before the RFID chip is locked.

17. The method of claim 1, wherein the biographical digest comprises information about the mobile communication device.

18. The method of claim 17, wherein the information about the mobile communication device comprises one or more of a manufacturer identity, a device model identity, an initial hardware version identity, an initial software version identity, an initial preferred roaming list identity, a current software version identity, or a current preferred roaming list identity.

* * * * *